C. N. DETWILER.
FASTENER.
APPLICATION FILED MAY 17, 1917.
1,277,876.
Patented Sept. 3, 1918.
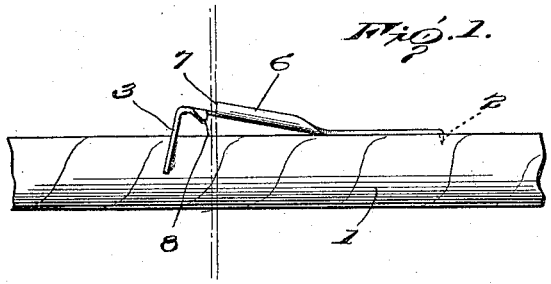
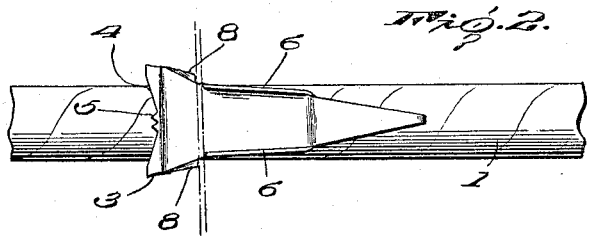
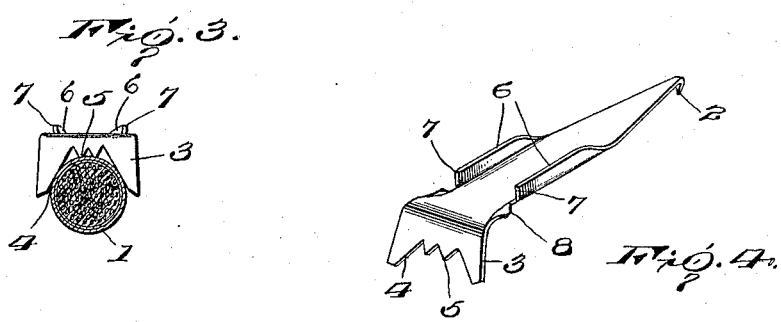
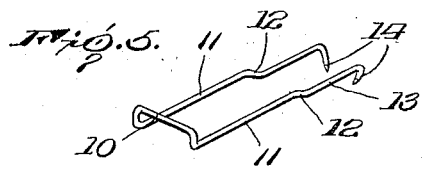
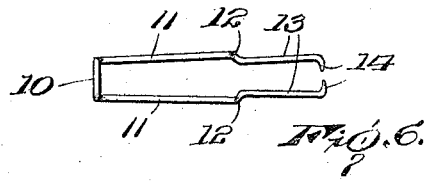
WITNESSES:
C. N. Detwiler
INVENTOR
BY
ATTORNEYS

UNITED STATES PATENT OFFICE.

CHARLES N. DETWILER, OF TOLEDO, OHIO, ASSIGNOR TO THE NATIONAL METAL MOULDING COMPANY, OF PITTSBURGH, PENNSYLVANIA.

FASTENER.

1,277,876.  Specification of Letters Patent.  Patented Sept. 3, 1918.

Application filed May 17, 1917. Serial No. 169,361.

*To all whom it may concern:*

Be it known that I, CHARLES N. DETWILER, a citizen of the United States, residing at Toledo, in the county of Lucas and State of Ohio, have invented certain new and useful Improvements in Fasteners, of which the following is a specification.

This invention relates to devices for preventing flexible tubing or cables, employed in wiring buildings for electric lighting or other purposes, from slipping through the wall of an outlet or junction box after it has once been properly located and secured within said box. The invention seeks to provide a device for the stated purpose which may be manufactured at a slight cost and which may be easily applied and prove highly efficient when applied.

The invention is illustrated in the accompanying drawings, in which—

Figure 1 is an edge view of a fastener embodying my invention applied to a flexible tubing or cable with a portion of the wall of a junction pipe indicated in dotted lines;

Fig. 2 is a plan view of the same;

Fig. 3 is an end view of the fastener with the cable or tubing in section;

Fig. 4 is a detail perspective view of the fastener;

Figs. 5 and 6 are respectively a perspective and a plan view of a different form of the fastener.

The cable or tubing 1 may be of any well-known type. In carrying out my invention, I provide a body which is tapered toward one end and is provided at said end with a tooth or spur 2 adapted to take into the tubing or cable, as shown in Figs. 1 and 2. The opposite end of the body is provided with a depending lip 3 having its edge 4 arcuate so as to fit over the circumference of the tubing and constructed with teeth or spurs 5 adapted to take into the tubing. Movement of the body or fastener longitudinally of the tubing will obviously be prevented by the engagement of the spurs or teeth with the tubing. The tapered formation of the fastener body tends to cause the same to bind against the wall of the opening in the side of the junction box through which the fastener and the cable are passed. Upon the side edges of the fastener body, I form the upstanding ribs or flanges 6 which have abrupt terminals 7 at their ends nearer the wider end of the fastener body and these abrupt terminals form stops or shoulders which are adapted to engage against one surface of the side of the junction box and thereby resist movement of the tubing and fastener in a direction which brings the shoulders against the side of the box. Immediately adjacent the said terminals or shoulders 7, the side edges of the body are more divergent than the portions of the same having the flanges 6 and are provided with laterally and downwardly extending stops 8 to engage against the side of the junction box so as to resist movement of the fastener and the cable or tubing in a direction opposite to that which is resisted by the shoulders or stops 7.

The tapered or wedge-like formation of the fastener body will permit it to pass readily through the opening in the side of the box, as will be readily understood on reference to Fig. 2, and its flexibility will facilitate the passage of the fastener through the opening until the shoulders or stops 7 have cleared the said opening whereupon the device will expand and the opposed surfaces 7 and 8 be brought into engagement with the side wall of the box and movement of the fastener in either direction will be thereby prevented.

In Figs. 5 and 6, I have illustrated a slightly different form of the device, in which it is formed from wire doubled upon itself at its center to form an arched portion 10 adapted to fit over the circumference of the tubing. The branches of the wire diverge slightly from the ends of the arch 10 so as to provide the side members 11 which are formed intermediate their ends with the beads 12 adapted to engage against the side wall of the box and thereby limit the movement of the tubing and the fastener. From the beads or stops 12, the terminal portions of the wire are expanded slightly, as shown at 13, and their ends are turned downwardly to form prongs 14 adapted to take into the cable or tubing.

My device is exceedingly simple in its construction and may obviously be produced at a very slight cost. It may be readily applied to a cable or tubing and properly positioned relative to the side of the junction or outlet box so as to permanently retain the tubing or cable in the position in which it may be set relative to the box.

Having thus described the invention, what is claimed as new is:

1. A device for the purpose set forth consisting of an elongated body adapted to extend along one side of a cable without inclosing the same and pass through a supporting wall, said body being longitudinally tapered and constructed at its tapered end to penetrate the cable radially and at its opposite end to span the cable and provided intermediate its ends at its side edges with stops to engage the supporting wall.

2. A device for the purpose set forth comprising a substantially plane body tapered toward one end and constructed at its ends to engage a cable and provided on its side edges with upstanding flanges and between its wider end and the ends of said flanges with lateral stops.

3. A device for the purpose set forth comprising a substantially plane body tapered toward one end and provided at said end with a tooth and constructed at its opposite end with a depending flange having an arched edge provided with depending teeth, the side edges of the body being provided with upstanding stops and between said stops and its wider end with laterally extending stops.

In testimony whereof I affix my signature.

CHARLES N. DETWILER. [L. S.]